Patented Apr. 30, 1940

2,198,800

UNITED STATES PATENT OFFICE 2,198,800

COLORED ASBESTOS PRODUCT

Marion S. Badollet, Fanwood, N. J., assignor to Johns-Manville Corporation, New York, N. Y., a corporation of New York No Drawing. Application December 23, 1936, Serial No. 117,344

5 Claims. (Cl. 106—24)

This invention relates to a colored asbestos product.

Many attempts have been made heretofore to color asbestos fibres in a manner to insure fastness of the color either when employed alone or in compositions containing them. When it has been attempted to use light-proof coloring agents, such as the common inorganic pigments, there has been difficulty in obtaining firm anchorage of the pigments to the fibres without the use of a thick paint film or the like, which cause loss of fireproofness, flexibility, or other properties that are desired in the finished asbestos product.

The present invention comprises the method of causing proper anchorage of pigment on the asbestos fibres and the product resulting from the method, the term "anchorage" being used to include penetration or other intimate association adequate to reduce to a minimum the removal of the pigment from the fibres by washing with water or by rubbing lightly.

In general, the coloring agent or pigment is mixed with an anchoring medium and the resulting mixture is incorporated into an asbestos cement composition or the like or upon asbestos fibres alone.

The anchoring medium is a material that lowers the surface tension of water in contact therewith and, when emulsified with water and then mixed with asbestos fibres, becomes largely associated with the fibres. Thus, the medium is separated from the aqueous emulsion and drawn into the fibres, carrying with it pigment originally intimately mixed with the medium.

I prefer to use, as the anchoring medium, a sulfonated oil, such as sulfonated castor oil, sulfonated products of oxidized solid or liquid paraffinic or naphthenic hydrocarbons, or sulfonation products of the higher alcohols of pronounced surface-tension lowering property. While my invention is not limited to any theory of explanation of the firmness of anchorage secured, the anchoring media that serve best my purpose are those adapted to react chemically with asbestos fibres and, for that reason, become difficultly removable or completely irremovable upon washing with water. Thus, sulfonated castor oil, commonly known as Turkey red oil, may react with an alkaline earth metal silicate of asbestos, to give a water-insoluble product including probably an alkaline earth metal ricinoleate or a derivative thereof.

Asbestos fibres that I have used to advantage are of the variety known as chrysotile. For some purposes, I may use other asbestos fibres, as, for example, crocidolite, amosite or tremolite, these latter three preferably being used either in commercial form or after activation, as by being autoclaved with milk of lime or by other activation treatment described in U. S. Patent 2,068,219 issued to me on January 19, 1937.

The cementitious material, if used, is suitably hydraulic. While I have obtained especially good results with Portland cement, there may also be used such other cementitious material as calcium aluminate cement or gypsum plaster.

The pigment is selected to give the desired color and fastness to light. The pigment should be very finely ground. Any one of a large number of pigments may be used, as, for instance, carbon black, chrome greens, chrome yellows, zinc oxide, lithopone, and titanium oxide, alone or mixed with others.

Using the anchoring medium of the kind described, a very small amount is adequate, this proportion being less than that which would modify greatly the stiffness or flexibility of an individual fibre or of a fabric containing the fibre. For instance, I may use the anchoring medium in proportion less than that of the pigments. I have used to advantage 0.4 part by weight of Turkey red oil to 3.6 parts of pigment and 75 parts of chrysotile asbestos fibres. While the proportion of the anchoring medium may be varied, I prefer to use proportions ranging from about 0.2 to 1 part by weight to 100 parts of the fibres.

The invention will be illustrated more specifically by the following detailed descriptions of typical compositions made in accordance with the invention.

In making a colored asbestos cement sheet, there is formed an intimate mixture of 9 parts by weight of pigment and 1 part of Turkey red oil wetting agent. The resulting mixture is dispersed in a large amount of water, say 900 parts. Into the dispersion there is then introduced 200 parts of chrysotile asbestos fibres (Canadian) of relatively short fibre length, such as commonly used in the manufacture of asbestos cement shingles, 75 parts of finely divided silica, such as ground sand, and 125 parts of Portland cement.

The resulting composition is shaped into a sheet and strongly compressed, as, for instance, in the filtering bed of a hydraulic press of the type that is in commercial use for the pressing of asbestos cement sheets. During the pressing operation a large part of the water, in excess of that required to cure the Portland cement, is expressed. The product is removed from the press and allowed to harden.

The product so made contains the pigment predominantly associated with the asbestos fibres so that they are more intensely colored than the intervening matrix of cement. The color is not removed from the fibres by washing with water or rubbing lightly, the reason for the firmness of anchorage being probably due largely to chemical combination of the anchoring medium with the fibres.

In a preparation omitting the cement, there were mixed 73 parts by weight of asbestos fibres, 3 parts of pearl starch, 3.6 parts of pigment (dry weight), 0.4 part anchoring medium (Turkey red oil), and a very large volume of water, to form a dilute suspension in a paper beater. The resulting composition was formed into a felt on a paper machine.

In making the above mixture for forming into a paper, the pigment was first intimately mixed with the anchoring medium, to form a thick paste, the pigment being well dispersed in the oily medium, as by a conventional means, as, for example, by being mixed roughly and then sent through a paint grinding mill.

The thick dispersion so made is preferably diluted before use, as by being emulsified with many times its weight of water.

When the ingredients described are mixed in the beater, the beating action is made very gentle; the asbestos fibres withdraw from the aqueous mixture the anchoring medium and pigment associated therewith. The said medium penetrates the fibres and draws with it the pigment, so that intimacy of association of the anchoring medium, pigment and asbestos fibres is obtained.

The paper made as described is subjected to the usual finishing operations, including drying at an elevated temperature to remove water. Thus, the paper may be dried at a temperature of about 212° F. or slightly higher, the temperature of drying being below that which, if used, would decompose the starch or other organic material present.

The paper so made is useful as fireproof or fire-resistant decorative paper.

The asbestos cement product, made as described above and including the pigmented fibres, is useful for purposes for which asbestos cement board is commonly used.

In case there is objectionable foaming during beating or mixing of the several materials, in the process described, mineral seal oil should be added to the anchoring medium and emulsified. This mixture is then used for dispersing the pigment, so that foaming is minimized during the periods of agitation in the beaters or cylinder vats. The mineral oil by its surface activity destroys the foam rapidly.

It will be understood that the details given are for the purpose of illustration, not restriction, and that variations within the spirit of the invention are intended to be included in the scope of the appended claims.

What I claim is:

1. A colored asbestos product comprising an intimate mixture of asbestos fibres, a hydraulic cementitious material in hardened condition, a pigment predominantly associated with the fibres, and a small proportion of a pigment anchoring medium selected from the group consisting of sulphonated castor oil, sulphonated products of oxidized solid or liquid paraffinic or naphthenic hydrocarbons, or sulphonation products of the higher alcohols of pronounced surface-tension lowering property extending into the fibres and being chemically combined therewith.

2. A colored asbestos product comprising an intimate mixture of asbestos fibres, a hydraulic cementitious material in hardened condition, a pigment, and a sulfonated oil, the said pigment and sulfonated oil being associated predominantly with the fibres and adhered thereto.

3. Colored asbestos comprising asbestos fibres, a pigment, and a pigment anchoring medium selected from the group consisting of sulphonated castor oil, sulphonated products of oxidized solid or liquid paraffinic or naphthenic hydrocarbons, or sulphonation products of the higher alcohols of pronounced surface-tension lowering property, the pigment being dispersed in the medium and the medium being chemically combined with the fibres.

4. Colored asbestos comprising asbestos fibres, a pigment, and a sulfonated oil, the oil being intimately associated with the pigment and chemically combined with the fibres.

5. Colored asbestos comprising asbestos fibres, a pigment predominantly associated with the fibres, and an anchoring medium therefor, said medium being selected from the group consisting of sulphonated castor oil, sulphonated products of oxidized solid or liquid paraffinic or naphthenic hydrocarbons, or sulphonation products of the higher alcohols of pronounced surface-tension lowering property, the pigment and medium being intimately associated with each other, and the proportion of the said medium being substantially less than the proportion of the pigment.

MARION S. BADOLLET.